United States Patent
Kapell

Patent Number: 5,993,218
Date of Patent: Nov. 30, 1999

[54] MULTI-SIDED WORD KIT

[75] Inventor: David Kapell, Minneapolis, Minn.

[73] Assignee: Magnetic Poetry, Inc., Minneapolis, Minn.

[21] Appl. No.: 08/946,504

[22] Filed: Oct. 7, 1997

Related U.S. Application Data

[60] Provisional application No. 60/027,759, Oct. 7, 1996.

[51] Int. Cl.[6] .............................. G09B 1/08; G09B 1/16; G09B 1/18
[52] U.S. Cl. ..................... 434/168; 434/172; 434/174; 434/167; 428/900
[58] Field of Search ......................... 273/155; 434/73, 434/134, 167, 168, 171, 172, 156, 190; 428/900

[56] References Cited

U.S. PATENT DOCUMENTS

| | | | |
|---|---|---|---|
| 1,542,031 | 6/1925 | Bruhn | 434/172 |
| 2,520,649 | 8/1950 | Northrop | 434/171 |
| 3,210,080 | 10/1965 | Rael | 446/138 |
| 3,839,130 | 10/1974 | Dean et al. | 428/28 |
| 4,613,309 | 9/1986 | McCloskey | 434/170 |
| 4,865,324 | 9/1989 | Nesis | 273/155 |

OTHER PUBLICATIONS

Advertising Material, Single–Sided Poetry Kit, 2 pages.

*Primary Examiner*—Robert A. Hafer
*Assistant Examiner*—Kurt Fernstrom
*Attorney, Agent, or Firm*—Patterson & Keough, P.A.

[57] ABSTRACT

A word kit includes an assemblage of objects, each object presenting a plurality of surfaces. The assemblage includes a first set of objects having a first surface of the plurality surfaces. A word selected from an interchangeable part of speech is depicted on the first surface and each additional surface of the plurality surfaces depicts another word selected from the interchangeable part of speech. A second set of objects has each of the plurality of surfaces thereof depicting a noninterchangeable series of letters.

12 Claims, 4 Drawing Sheets

Fig. 11 black | night | never | has | a | blue | evening the | symphony | will | invigorate | music

Fig. 12 livid | asphalt | always | has | a | dead | winter the | cascade | will | suffocate | magic

MULTI-SIDED WORD KIT

CROSS-REFERENCES TO RELATED APPLICATIONS

This application claims the benefit of U.S. Provisional Application Ser. No. 60/027,759, filed Sep. 7, 1996, the contents of which are incorporated herein by reference.

FIELD OF THE INVENTION

The present invention relates to a word kit. More particularly, the kit may be used for creating poetry and as a teaching aid for teaching speech concepts.

BACKGROUND OF THE INVENTION

A prior art kit consisting of a collection of flexible plastic magnets has been most useful in teaching various language skills and for recreational purposes. Each of these magnets displays a word or a word-fragment printed on only one surface thereof. The user installs all of the magnets on any ferric surface, then arranges them in some given order. In doing so, various poems, epithets, or other desired phrases are thereby constructed. While useful and enjoyable, still another dimension of this concept has been missing. Specifically, the use of this concept in teaching the proper order and meaning of various parts of speech and in seeing the humorous and nonsensical effects of readily randomly changing one or more words in a sentence or phrase.

SUMMARY OF THE INVENTION

The present invention is a kit providing an enjoyable, positive method of teaching a concept of speech. More specifically, the present invention provides positive reinforcement on the use of various parts of speech. This positive reinforcement is through illustration of the interchangeability of a given subset of the parts of speech and by emphasizing the non-interchangeability of other parts of speech. Additionally, such interchangeability provides entertainment by means of the frequently humorous and nonsensical effects of readily randomly changing one or more word in a sentence or phrase.

A word kit includes an assemblage of objects, each object presenting a plurality of surfaces. The assemblage includes a first set of objects having a first surface of the plurality surfaces. A word selected from an interchangeable part of speech is depicted on the first surface and each additional surface of the plurality of surfaces depicts another word selected from a set of words that are of the same part of speech. Further, the words may be selected from a set of words that are an interchangeable part of speech. The word kit assemblage may include a second set of objects which has each of the plurality of surfaces thereof depicting a noninterchangeable series of letters.

Interchangeable parts of speech include nouns, verbs, adjectives, and adverbs. Non-interchangeable parts of speech include articles, pronouns, prepositions, and forms of the verb "to be". Other non-interchangeable series of letters include prefixes and suffixes. The first and second surfaces may be reversibly adhereable to a supporting surface. Moreover, the first and second objects may be magnetically attracted to the supporting surface.

BRIEF DESCRIPTION OF THE INVENTION

FIG. 11 depicts two sentences formed by magnets of the present invention; and

FIG. 12 depicts the same two sentences of FIG. 11 with each word magnet reversed.

DETAILED DESCRIPTION OF THE DRAWINGS

Comprehension of the present invention can be gained through reference to the drawings in conjunction with a thorough review of, the following explanation. In order to facilitate a full appreciation of the invention, an overview of the preferred embodiment is initially provided. The overview is followed by more detailed explanation.

The present invention is an assembly of objects upon which words are displayed on a multiplicity of object surfaces. The objects are deployed as desired in an order which represents a phrase, a clause, or a sentence. Once deployed, the objects may be vertically rotated. Thus being rotated, another surface is thereby displayed. On the other surface another interchangeable word is depicted or the same non-interchangeable word is displayed thereon.

Figure 1:
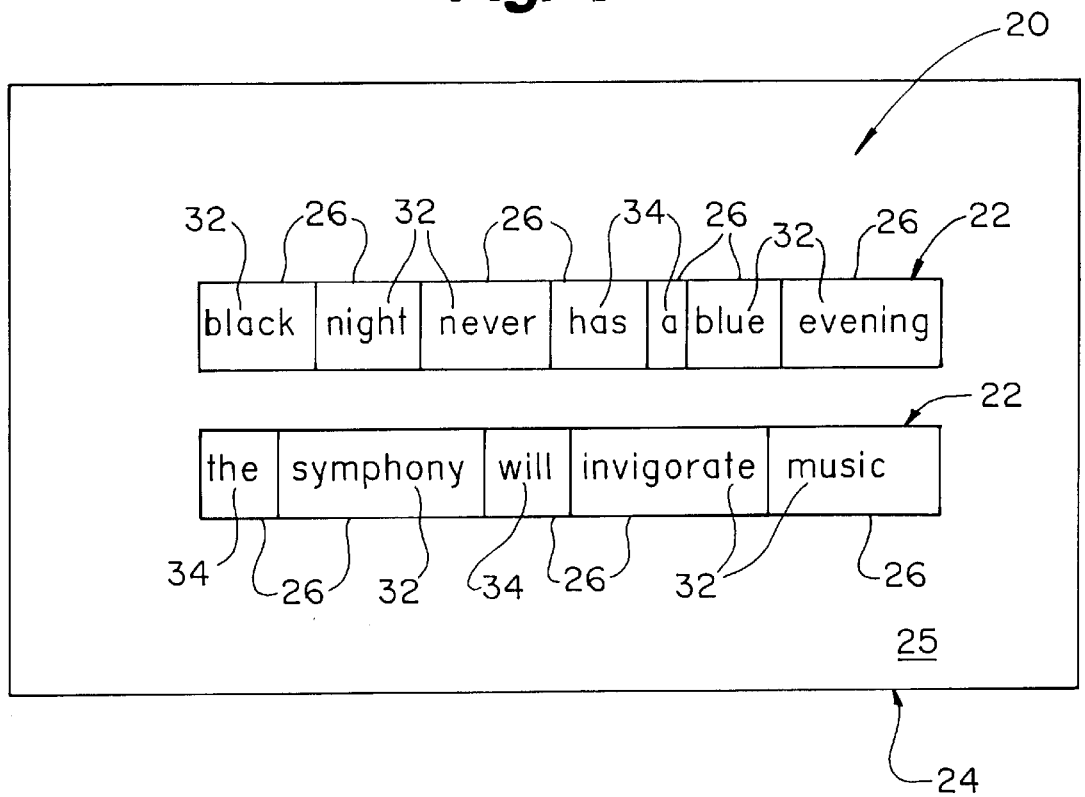
FIG. 1 is a top plan view of deployed objects of the present invention.
Figure 2:
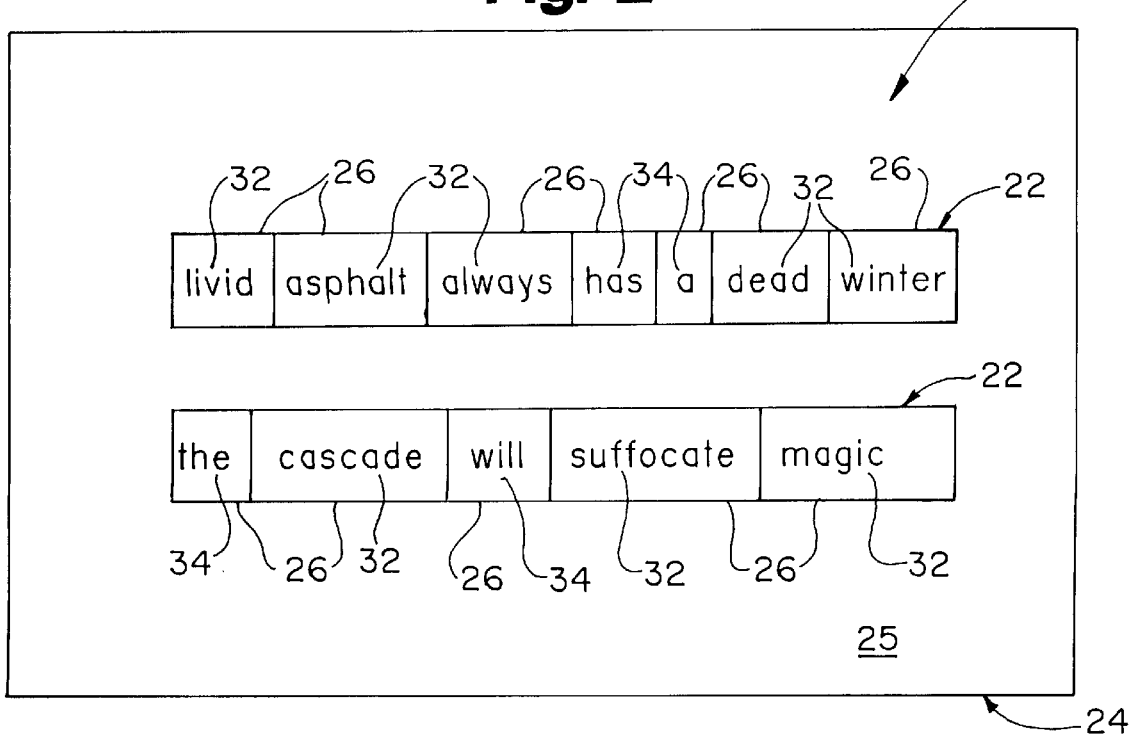
FIG. 2 is a top plan view of the deployed objects of the present invention after having been vertically rotated.
Figure 3:
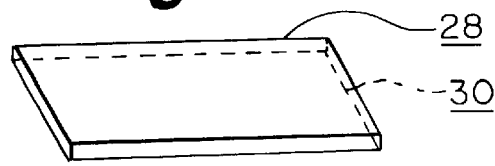
FIG. 3 is an elevated perspective view of a first surface geometry of the objects of FIG. 1.
Figure 4:
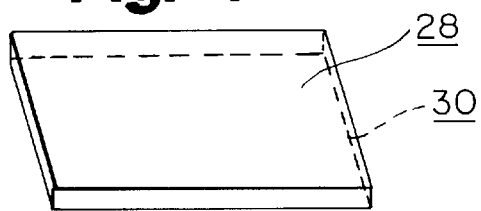
FIG. 4 is an elevated perspective view of a second surface geometry of the objects of FIG. 1.

Referring particularly to FIGS. 1, 2, kit 20 broadly includes an assemblage of objects 22. The assemblage of objects 22 is depicted on a supporting member 24. Assemblage 22 includes a plurality of individual objects 26. As depicted in FIG. 3, it may be seen that each object 26 includes a plurality of surfaces 28, 30. Each surface 28, 30 bears a word or a series of letters in accordance with the present invention.

Referring again to FIGS. 1, 2, assemblage 22 is further divided by the words or a series of letters depicted on surfaces 28, 30. Specifically, assemblage 22 is further divided based on whether the words or series of letters depicted on surfaces 28, 30 represent an interchangeable part of speech 32 or a non-interchangeable part of speech 34. Examples of interchangeable parts of speech 32 include nouns, verbs, adjectives, and adverbs, and words used as more than a single part of speech. Examples of non-interchangeable parts of speech 34 include articles, pronouns, prepositions, and forms of the verb "to be". Also included as non-interchangeable parts of speech 34 are letter series which include suffixes and prefixes.

Member 24 presents a surface 25 upon which objects 26 may be deployed in the desired manner of the present invention. Objects 26 and surface may reversibly adhere to each other. Objects 26 and surface may also be mutually magnetically attracted. In a preferred embodiment, the objects 26 have a permanent magnet disposed therein. The magnet causes the individual objects 26 to adhere to a ferric surface 25. Such surface 25 may then be generally vertical, such as the door of a refrigerator or the like.

Figure 5:
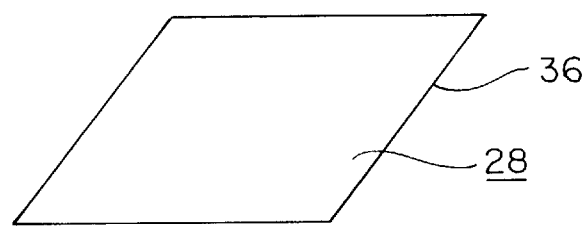
FIG. 5 is a top plan view of a third surface geometry of the objects of FIG. 1.
Figure 6:
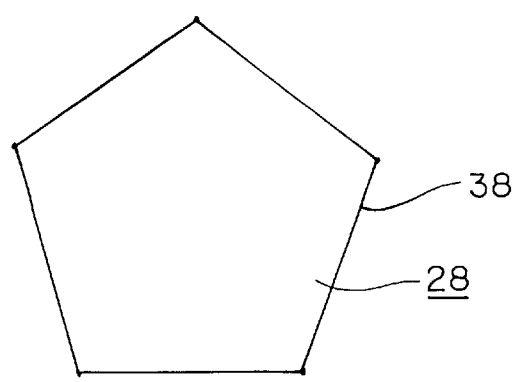
FIG. 6 is a top plan view of a fourth surface geometric of the objects of FIG. 1.

While objects 26 may be preferably embodied as possessing square or rectangular surfaces 28, 30, any number of surface geometries are equally acceptable. Examples of alternative preferred surface geometries are depicted in FIGS. 5, 6, as parallelogram 36 and pentagon 38, respectively.

Figure 7:
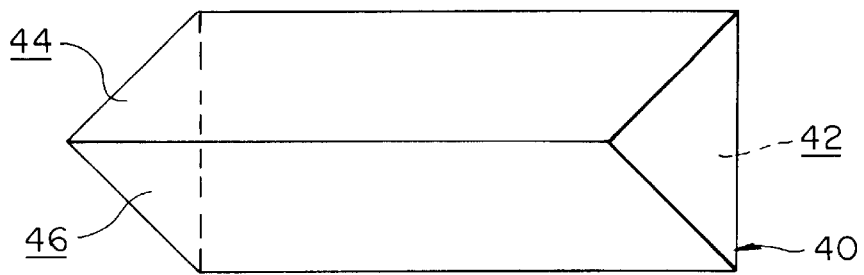
FIG. 7 is a perspective view of an alternate preferred configuration of the present invention, partially depicted in phantom to present portions thereof that would otherwise be concealed.
Figure 8:
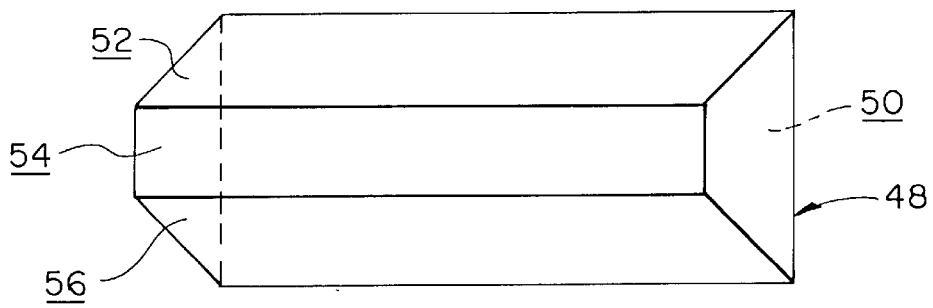
FIG. 8 is a perspective view of an alternate preferred configuration of the present invention, partially depicted in phantom to present portions thereof that would otherwise be concealed.
Figure 9:
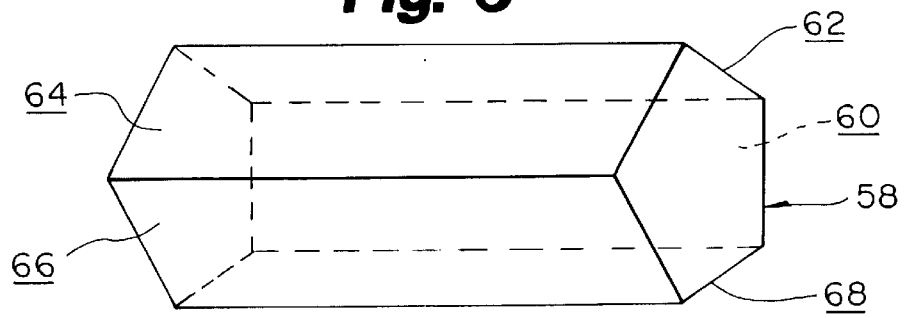
FIG. 9 is a perspective view of an alternate preferred configuration of the present invention, partially depicted in phantom to present portions thereof that would otherwise be concealed.
Figure 10:
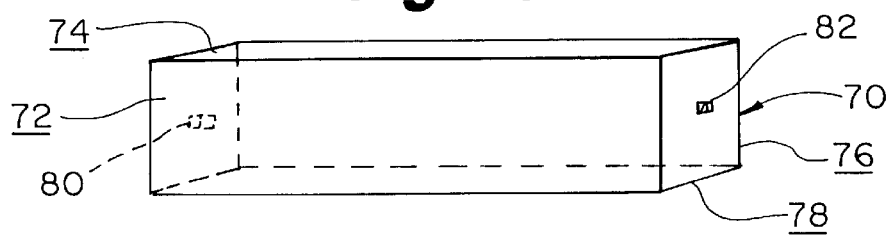
FIG. 10 is a perspective view of an alternate preferred configuration of the present invention, partially depicted in phantom to present portions thereof that would otherwise be concealed.

The present invention also includes objects which display words or a series of letters on more than two surfaces thereof. Examples of such objects are depicted in FIGS. 7–10. In FIG. 7, a triangular prism 40 is depicted. Triangular prism 40 includes surfaces 42, 44, 46. Quadrilateral prism 48 includes surfaces 50, 52, 54, 56. Pentagonal prism 58 presents surfaces 60, 62, 64, 66, 68. Parallelpiped 70 presents surfaces 72, 74, 76, 78. As with the case of objects 26, surfaces 42–46, 50–56, 60–68, 72–78 display a word or a series of letters in accordance with the present invention (not shown). Parallelpiped 70, or any other object of the present invention, may also include socket 80 and extension 82. Extension 82 rotatably fits into socket 80, thereby allowing objects 70 to be interlinked into phrases or otherwise as discussed above. Upon rotation, other or the same words or letter series are displayed.

In operation, the objects 26 are spread on a surface 25, displaying many words to be selected from. A person using the kit 20 of the present invention may then select certain objects 26 to form a desired sentence or phrase. Referring to FIG. 1, objects 26 are depicted arranged into a phrase or a sentence. In being so arranged, either surface 28 or surface 30 is exposed to view. After being so deployed, objects 26 may rotated vertically, thereby exposing the previously non-exposed surface 28 or 30 to view as depicted in FIG. 2. Interchangeable object 32 now depicts a different word. Whereas, non-interchangeable objects 34 depict the same word or series of letters on each surface 28, 30. This exercise illustrates to the user how various parts of speech may be used and interchanged in a sentence, phrase, or clause. Moreover, this exercise further illustrates how altering an interchangdable object 32, hence an interchangeable part of speech, alters the meaning thereof.

As can be seen by comparing FIGS. 1 and 2, the words "black" (FIG. 1) and "livid" (FIG. 2) are depicted on opposite surfaces 28, 30 of the object 26. The words "black" and "livid" are the same part of speech and are interchangeable. Reversing the surfaces 28, 30 of the object 26 results in substituting the word "livid" for the word "black". The resulting substitution preserves the proper sentence structure, but the resulting sentence may be nonsensical and/or humorous.

The two sided magnetic poetry kit product is an improvement on the original Magnetic Poetry Kit® product, the latter of which consists of a collection of 450 fingernail-sized flexible plastic "fridge" magnets, each screen printed on one side with a different word or word fragment. The consumer installs all of the magnets on any steel surface (refrigerator door, file cabinet, cookie sheet, etc.) and arranges them to make "poems," epithets, truisms and generally humorous and/or bizarre phrases.

The two sided magnetic poetry kit product takes this idea a step further by both printing a word on both sides of each magnet, and having the flexible magnetic material magnetized in both directions, so that it sticks right-side-up and upside-down. The words on either side of each magnet are of the same part of speech (noun, verb, adjective, etc.), so that an adjective flipped over would reveal another adjective, a verb flipped would reveal another verb, and so on. Furthermore, any word that could be defined under two parts of speech, would flip to reveal a similar word; for instance, "judge," which is both a noun and a verb, might flip to reveal "whip," which is also both a noun and a verb. However, words that are referred to as "connective words and word fragments," such as articles, pronouns, prepositions, prefixes, suffixes, etc., are generally the same on both sides; thus, "the" flips to reveal "the," "ing" flips to reveal "ing," and so on.

The idea is that the consumer would install all of the fridge magnets (about 250 in product) on a steel surface, make poems, epithets, and phrases, and then flip one or all of the magnets to reveal respectively a subtle or entirely new meaning.

Mechanically, each magnet is printed in such a way that each magnet can be flipped vertically and wind up with the word on the other side right-side-up; that is, if you held up a magnet so that it read right-side-up to you, a person facing you would see the word on the opposite side as upside-down. This makes the flipping of each magnet physically easier than flipping it horizontally.

The product will include a listing of all of the words in the kit, arranged to show what each word flips lo reveal, to aid those searching for a certain word.

FIG. 11 depicts two sentences formed by magnets of the present invention; and FIG. 12 depicts the same two sentences of FIG. 11 with each word magnet reversed.

Because numerous modifications may be made to this invention without departing from the spirit thereof, the scope of the invention is not to be limited to the embodiments illustrated and described. Rather, the scope of the invention is to be determined by appended claims and their equivalents.

What is claimed is:

1. A word kit, comprising:
   an assemblage of first objects, each first object having a plurality of object surfaces, each object surface of the plurality of object surfaces displaying a different word selected from an interchangeable part of speech, said part of speech being selected from a list of parts of speech including nouns, adjectives, adverbs, verbs, pronouns, proper nouns; and
   an assemblage of second objects, each second object having a plurality of object surfaces, each object surface of the plurality of object surfaces displaying the same noninterchangeable part of speech, said part of speech being selected from a list of parts of speech including articles, pronouns, prepositions, prefixes, suffixes, and forms of the verb "to be";
   said first and second objects having means for reversibly, magnetically adhering to a ferric supporting surface.

2. The kit of claim 1, wherein each first object has a first object surface and an opposed second object surface and each second object has a first object surface and an opposed second object surface.

3. The kit of claim 2, wherein each first object is a magnet and each second object is a magnet.

4. The kit of claim 3 wherein the magnets are formed of a flexible magnetic material.

5. The kit of claim 1 wherein a word is screened on each object surface of each first object, and and a part of speech is screened on each object surface of each second object.

6. The kit of claim 1, wherein an object having an interchangeable word that is definable as more than one part of speech on a surface, is reversible to reveal a different interchangeable word that is definable as the same more than one parts of speech.

7. The kit of claim 2, the word displayed on the first object first object surface being displayed right side up when the word displayed on the opposed second object surface is displayed upside down and the part of speech displayed on the second object first object surface is displayed right side up when the part of speech displayed on the second object opposed second object surface is displayed upside down.

8. A word kit, comprising:
    a plurality of magnets being moveable on a surface for forming poems, epithets, phrases and the like, a first portion of the plurality of magnets having a first surface and a second opposed surface and presenting a different word selected from an interchangeable part of speech on each of said surfaces, said part of speech being selected from a list of parts of speech including nouns, adjectives, adverbs, verbs, pronouns, proper nouns, a second portion of the plurality of magnets having a first surface and a second opposed surface and presenting the same noninterchangeable part of speech on each of said surfaces, said part of speech being selected from a list of parts of speech including articles, prepositions, prefixes, suffixes, and forms of the verb "to be".

9. The kit of claim 8 wherein the magnets are formed of a flexible magnetic material.

10. The kit of claim 8 wherein a word is screened on each of the first portion of the plurality of magnets, and and a part of speech is screened on each of the second portion of the plurality of magnets.

11. The kit of claim 8, wherein a magnet having an interchangeable word that is definable as more than one part of speech on a surface, is reversible to reveal a different interchangeable word that is definable as the same more than one parts of speech.

12. The kit of claim 8, the word displayed on a first magnet surface being displayed right side up when the word displayed on an opposed second magnet surface is displayed upside down.

* * * * *